Figure 5:
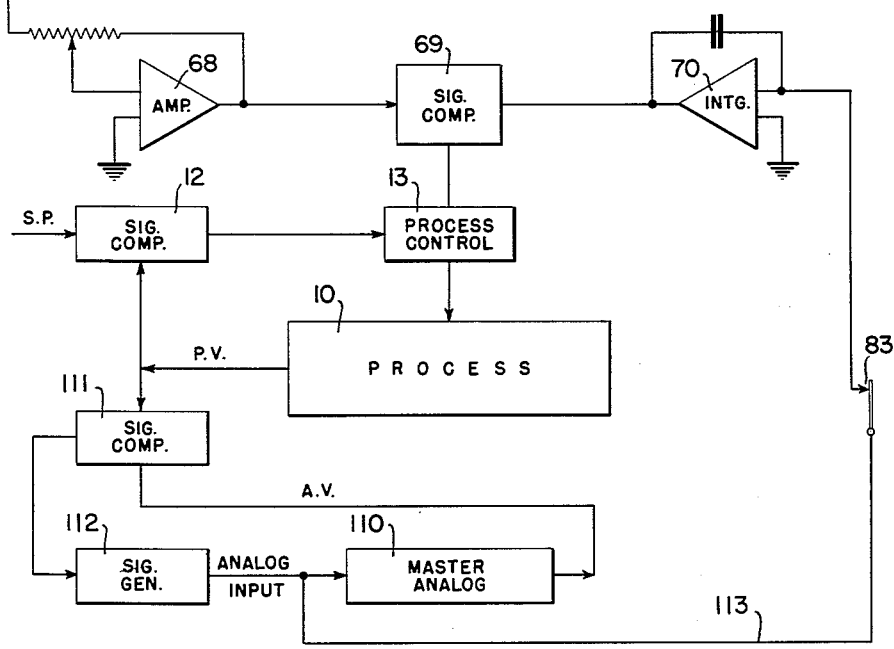

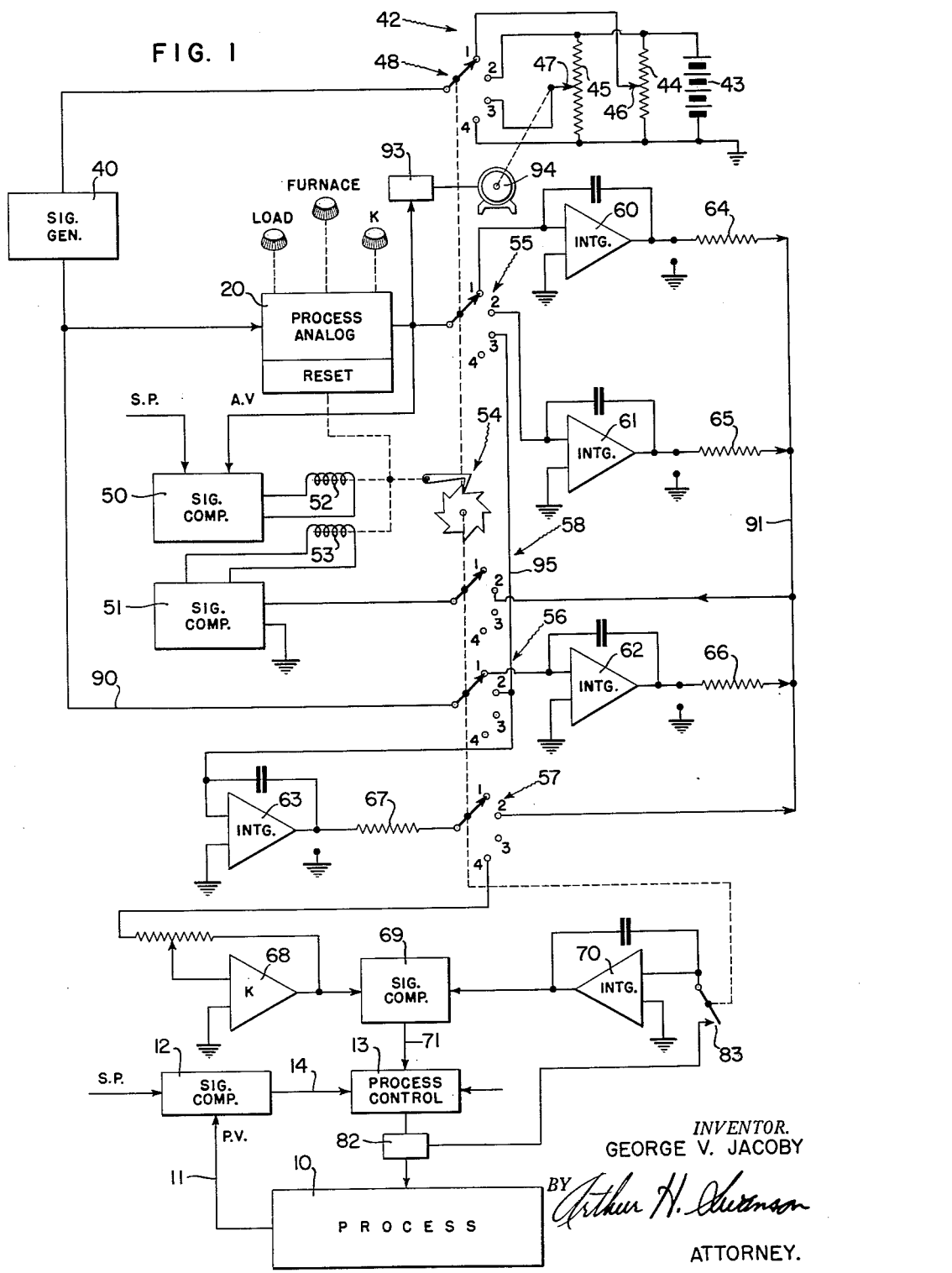

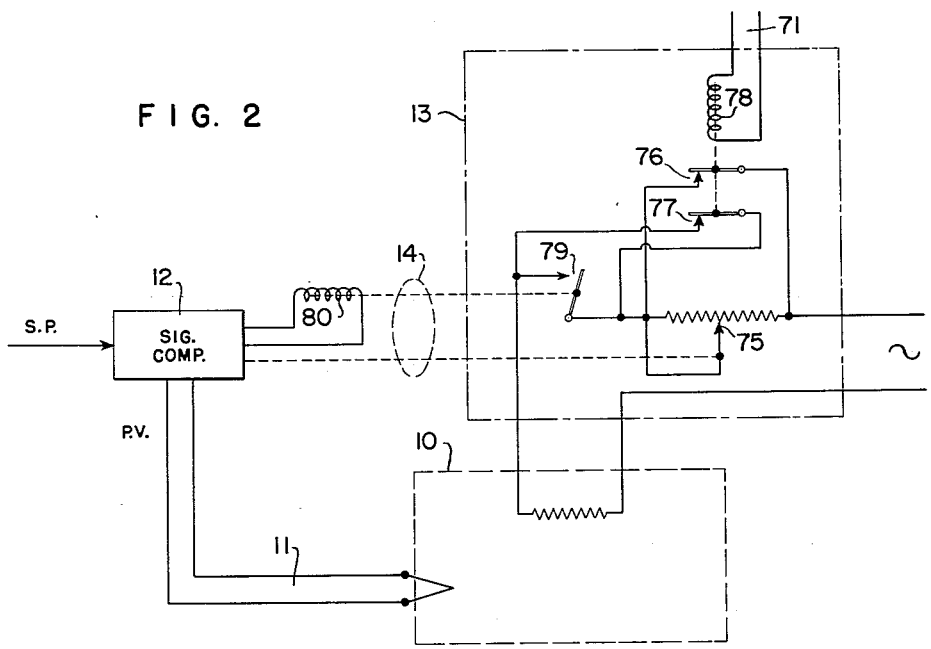
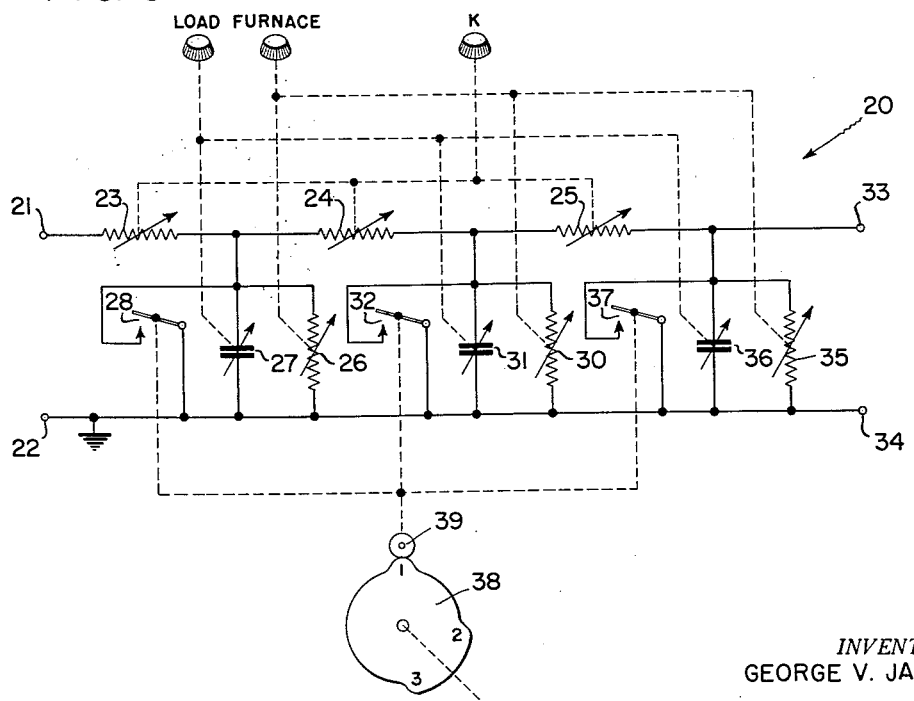

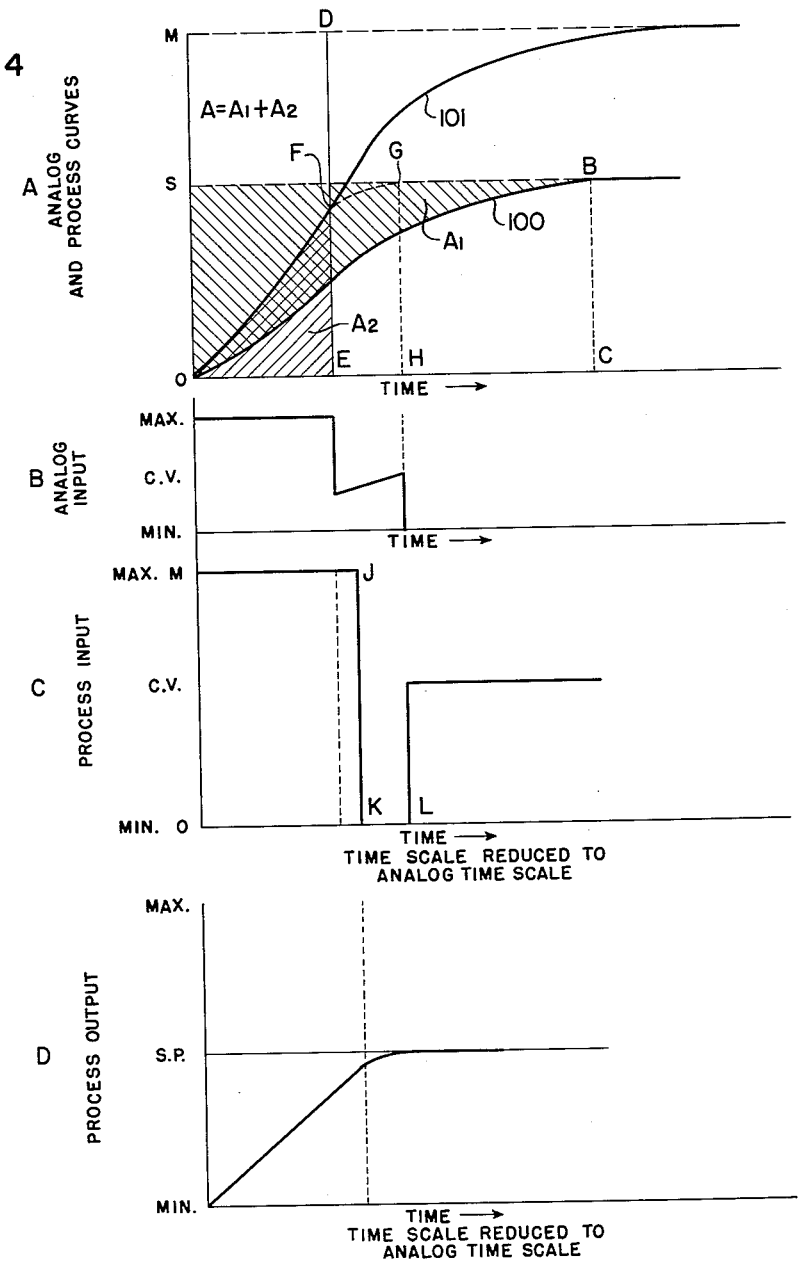

United States Patent Office 3,011,709
Patented Dec. 5, 1961

3,011,709
COMPUTER APPARATUS FOR RAPIDLY CHANGING THE VALUE OF A PROCESS VARIABLE
George V. Jacoby, Philadelphia, Pa., assignor to Minneapolis-Honeywell Regulator Company, Minneapolis, Minn., a corporation of Delaware
Filed Mar. 24, 1955, Ser. No. 496,423
9 Claims. (Cl. 235—151)

A general object of the present invention is to provide a new and improved control apparatus useful in regulating the magnitude of a process variable. More specifically, the present invention is concerned with an improved apparatus for regulating the magnitude of a process variable particularly under startup conditions or under conditions wherein the variable is to be changed from one magnitude to another.

One of the problems present in the automatic regulation of a process variable arises when a process variable is to be changed from one value to another. Under ideal and optimum operating conditions, it is desired that the process variable be immediately stepped from its present condition to its future desired position without there being any overshoot or hunting of the process variable once it has reached its desired future position or value.

The quickest way to change a process variable from one magnitude to another is to apply a maximum change condition which will cause the process variable to go in the desired direction. Thus, if it is desired to raise the process variable from one value to another, the quickest way to move the process variable is to apply a maximum input to the process. However, in processes of the second order or higher, if the maximum input is continued until the process variable reaches its desired new position, the inertia of the process will cause the process variable to overshoot and create an unstable condition in the process variable until the hunting or oscillation dies out.

To eliminate the tendency for the process to overshoot when a maximum input is supplied to the process, it is necessary that the process input be shifted from a maximum input to a minimum input at a predetermined instant which will insure that the process variable will coast to the desired set point without any overshoot. The present invention is directed particularly to apparatus which will predict the instant at which the process input must be shifted from a maximum input to a minimum input so as to cause the process variable to shift to its newly desired position in a minimum of time. It has been found that this may readily be accomplished by the use of an analog by which prediction of the process input requirements may be made.

It is accordingly a further object of the present invention to provide a new and improved controller for a process variable which utilizes predicting means for determining the amount of change required to change a process variable from a first magnitude to a second magnitude.

The amount of input to a process necessary to change the process variable from one magnitude to another may be broken down into two separate parts. One part comprises the useful amount of input to the process required to cause the process variable to change from one magnitude to another if no losses were present. The second part of the input to the process is the amount of input required to supply the losses in the process. By obtaining a signal indicative of the useful input required by the process, it is possible to produce a controller which will automatically control the input to the process.

It is therefore a still further object of the present invention to provide an improved control apparatus for regulating the magnitude of a process variable wherein means are provided for determining the amount of input required to change the process and the amount of input required to supply the losses from the process.

Still another object of the present invention is to provide a new and improved predicting controller for a process variable using an analog for the process where the analog produces a signal indicative of the total amount of power required to change the process variable from one magnitude to a second magnitude.

A still further object of the present invention is to provide a new and improved predicting controller utilizing a fast acting process analog with integrating means connected to the output thereof to determine the amount of power required to change the process variable from one magnitude to another and with a process controller connected to be controlled by the signal produced by said integrating means.

A still further object of the present invention is to provide a new and improved controller incorporating a fast acting predicting analog of the process to be controlled where the output of the analog is supplied to an integrating means which produces a signal indicative of the amount of power required to change a process variable from one magnitude to a second magnitude, where the process input supplies a second integrating means which produces a signal indicative of the actual amount of input to the process, and a process controller is regulated by the signals produced by the first and second integrating means.

The various features of novelty which characterize the invention are pointed out with particularity in the claims annexed hereto and forming a part of the specification. For a better understanding of the invention, its advantages, and specific objects attained with its use, reference should be had to the accompanying drawings and descriptive matter in which there are illustrated and described preferred embodiments of the invention.

Figure 6:
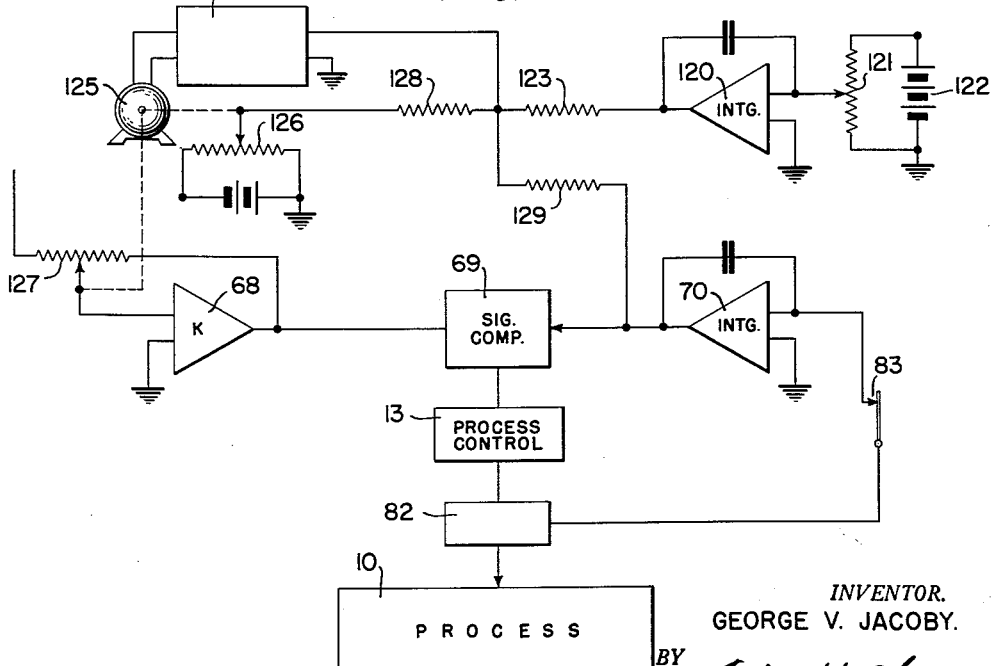

Of the drawings:
FIG. 1 shows a schematic diagram of a predicting controller operated in accordance with the principles of the present invention;
FIG. 2 shows a detail of the process control portion of the apparatus;
FIG. 3 is a schematic showing of the process analog;
FIG. 4 shows graphical representations of the input signals to the predicting analog as well as to the process analog;
FIG. 5 shows a process analog operating in parallel with the control process with means for determining the input to the process in accordance with the input to the analog in parallel therewith; and
FIG. 6 shows a further modification of FIG. 1.

Referring first to FIG. 1, the numeral 10 represents a process. In the description that follows, it will be assumed that the process 10 represents a furnace whose temperature is to be maintained at some desired value. Thus, the output from the process 10 on output lead 11 will be a temperature signal and will be referred to hereinafter as the process variable. It will be readily apparent that the principles of the present invention may well be adapted to any process variable control such as pressure, flow, level, or the like.

The output signal from the process 10 is fed through a signal comparator 12 where the signal is compared with a set point value and produces an output controlling action on a process controller 13 by way of a connecting lead 14. The signal comparator 12 may well take the form of the apparatus disclosed in the Walter P. Wills patent, 2,423,540, issued July 8, 1947. The signal comparator 12 will normally be in direct control of the process controller 13 until such time as it is desired to change the process variable from one selected value to a different value. In other words, all of the remaining portions of the apparatus shown in FIG. 1 are used only during those intervals when the process variable is shifted from one value to another.

The remaining portion of the apparatus disclosed in FIG. 1 is next considered. This apparatus is assumed to be an apparatus used for starting a process from a cold condition to a predetermined set point corresponding to the set point on the input of the signal comparator 12.

The apparatus for effecting maximum rate of change of the measured variable from one value to another includes a process analog 20 which is constructed in a conventional manner of resistance and capacity units so as to duplicate the parameters of the process 10. If the process analog is to be used with a number of different processes, the analog may well be adjustable to compensate for load, the type of furnace, and a constant K representative of other factors influencing the overall process. The analog has been shown in representative form in FIG. 3 in the form of an RC analog network. There is a pair of input terminals 21 and 22 connected to three series connected resistors 23, 24, and 25. Connected between the resistors 23 and 24 and to the grounded terminal 22 are a resistor 26 and a condenser 27. In parallel with the condenser 27 is a switch 28.

Connected between the resistors 24 and 25 and the grounded terminal 22 are a resistor 30 and a condenser 31. The condenser 31 is arranged to be shunted by a switch 32.

The analog has output terminals at 33 and 34, with these output terminals being shunted by a resistor 35 and a condenser 36. The condenser 36 is in turn arranged to be shunted by a switch 37.

The actuator for the switches 28, 32, and 37 is a camming mechanism 38 having a follower 39 cooperating with the surfaces thereof. The functioning of this switching cam will be considered below.

A signal generator 40, in FIG. 1, is arranged to supply the input signals to the process analog 20. This signal generator 40 may well take the form of any conventional generator circuit which will produce a predetermined output when a certain input signal is supplied thereto. The control signals for the signal generator 40 are derived from a battery 43 having a pair of potentiometers 44 and 45 connected in parallel therewith in a circuit 42. The potentiometer 44 has a slider 46 and the potentiometer 45 has a slider 47. The output signals from the battery 43 are arranged to be selectively switched by a switching deck 48, said deck being a part of a ganged switch and having a blade movable between one of four selected switch positions.

For actuating the switch deck 48, and a plurality of other switch decks, 55, 56, 57 and 58, is a pair of signal comparators 50 and 51. The signal comparator 50 may well take the form of the apparatus disclosed in the above mentioned Wills patent wherein the output is effective to operate a relay coil 52 when the analog variable A.V. is equal to the set point S.P. fed into the signal comparator. The signal comparator 51 may also be of the same type, with this signal comparator being effective to energize an output relay coil 53 when there is a zero input signal applied thereto. The relay coils 52 and 53 are arranged to operate a suitable ratcheting mechanism 54 to drive the individual decks of the switch means attached thereto. The individual decks are so ganged that the blade in each deck engages, at any given time, the contact in its deck which has the same number as that of the contacts engaged by the other blades at that time.

Arranged for connection to the output of the analog 20 or to the output of the signal generator 40 are a plurality of integrators 60, 61, 62 and 63. Each of these integrators may be of any commercially available type of operational integrator. The outputs of the respective integrators are fed through summing resistors 64, 65, 66, and 67.

An operational amplifier 68 is arranged to receive a signal from the integrator 63 in a manner to be described below. The output of the operational amplifier 68 is applied to a further signal comparator 69 which has as one input signal a signal from the operational amplifier 68, and which has as the other input signal a signal from an operational integrator 70. The signal comparator will be effective to actuate a relay in its output to control the operation of the process control 13 as has been shown in a representative form in FIG. 2.

As viewed in FIG. 2, the process control comprises a control for an electric furnace. For regulating the flow of power to the process 10, there is provided a rheostat 75 which is arranged to be shunted by a switch 76, connected in parallel therewith. Connected in series with the rheostat 75 is a further switch 77. Switches 76 and 77 are arranged to be actuated by the output of the signal comparator 69 by way of the leads 71 and the actuating coil 78. A further switch 79 is arranged to be controlled by the output of the signal comparator 12 by way of a relay coil 80. Both the relay coils 78 and 80 may be arranged to have cooperating therewith suitable latching means, not shown, to hold the relays in their actuated positions once they have become actuated.

For determining the input of the process 10, in FIG. 1, a suitable input measuring device 82 may be connected between the process control 13 and the process 10. In the case of an electrical input to the process 10, a power measuring transducer is effective and this may take the form of a thermal converter or other similar device. The output of the input measuring device 82 is arranged for connection to the input of the integrator 70. This input circuit to the integrator 70 will be under the supervising control of a switch 83.

The operation of the apparatus disclosed in FIG. 1 is considered first with reference to the graphical representations shown in FIG. 4. As pointed out above, the present apparatus is arranged to determine the total amount of input required to change a process variable from one magnitude to another. The amount of input may be broken down into two segments, one segment covering the useful power which is used in changing the process and the other segment is that segment which is necessary to take care of the losses in the process. The curves of FIG. 4 will be considered in terms of a process startup where the temperature of the process is to be changed from an ambient value to a desired set point value. The ambient value is represented by point zero in FIG. 4A while the desired set point value is represented by the point S on the ordinate of the plot. The point M on the ordinate of the plot in FIG. 4A represents the maximum to which the process can be brought if total input is supplied to the process.

The useful power required to change the process so that the process variable changes from zero to the point S may be determined by integrating the area between the curve 100 and the desired set point value S. In other words, it is necessary to determine the area of the space bounded by O—S—B—O.

This area $A_1$ is determined in the present apparatus by integrating the total input to the analog as identified by the area bounded by O—S—B—C—O and the losses into the process which are identified by the area under the curve 100 within the last defined space. This is the area O—B—C—O.

The area $A_1$ is then related to a further input signal to the analog which is integrated from the total or maximum input to the analog and the input required to supply the losses in the analog. With maximum input to the analog, the analog output will rise along the curve 101 and if allowed to go through its full change would approach the line M. The input to the analog will again be broken down into separate segments, one segment useful in changing the variable from its starting position to the predetermined set point position and the second segment comprising that amount required to supply the losses. The total input will be an integration with respect to time of the input from M to point D so that the area defined by the letters O—M—D—E—O is the total input to the process up to the time D—E. The amount of the input required to supply the losses at this maximum input is defined by the area $A_2$ which is bounded by the line O—F—E—O.

When the area A is equal to the sum of the area $A_1$ plus $A_2$, it is desired to shift the input to the process to a different level. In other words, if a maximum input is applied to the analog, the curve 101 will continue to go toward the maximum level M. As the curve 101 approaches the level S, it is necessary that the input to the process be reduced or the output of the analog will go beyond the desired level S. By cutting off the input of the process at time D—E, the process would normally coast toward the level S. However, since there will be losses occurring throughout the time that the process is coasting, the process will never reach the desired level S without some additional input to supply the losses. The additional losses in the process during the coasting interval would normally be defined by the area

E—F—G—H—E

This area last set forth may be determined by integration, and the total area of E—F—G—H—E combined with the area A will be representative of the total amount of input required to the process to change the process variable from one magnitude to another.

Referring back to FIG. 1, the apparatus is shown in its first computing position wherein it is desired to determine the area $A_1$ shown in FIG. 4. During this initial computing period, the individual decks 48, 55, 56, 57, and 58 are each switched to the No. 1 position. When deck 48 is in the No. 1 position, a bias signal from the battery 43 is applied to the input of the signal generator 40 from the slider 46 on the potentiometer 44. The output from the signal generator will then be of a magnitude corresponding to the level S shown in FIG. 4. The analog output will rise along the curve 100 shown in FIG. 4 and this output will be applied to the input of the integrator 60 so that the integrator 60 will have an output corresponding to the total area defined by the boundaries O—B—C—O. At the same time, the output of the signal generator 40 is also applied by way of lead 90 and deck 56 to the input of integrator 62. This integrator 62 will then have an output which will correspond to the area defined, in FIG. 4, by the letters O—S—B—C—O. The combined outputs of the integrators 60 and 62 are subtracted so that upon the output lead 91 there will be a signal representative of the area $A_1$.

As soon as the output of the analog 20 reaches the desired set point value, the signal comparator 50 will be effective to actuate its output relay coil 52 and by way of the ratcheting mechanism 54 advance the switch blades of each of the switching decks to position 2. When the ratcheting mechanism advances, the switching cam 38, shown in FIG. 3, will be effective to rotate in a counterclockwise direction so that the follower 39 shown riding on riser 1 will fall on a land surface between point 1 and point 2. When so falling, the switches 28, 32, and 37 will close and reset the analog to a desired starting position. It will be readily apparent that the desired zero position of the analog may well be selected to correspond to a predetermined condition in the process. As the present apparatus is being considered under start-up conditions, this may be effectively considered as zero.

With the analog 20 reset, the signal generator 40 will have applied to its input a second input signal which, in this instance, is calling for a maximum output from the signal generator. The input signal for the signal generator 40 is now derived from the battery 43 by way of the switching deck 48, now in position 2. This will result in a maximum signal bias on generator 40. The output of the signal generator 40 is applied directly to the input of the process analog 20. The output of the analog 20 is now applied through the switching deck 55, position 2, to the input of the integrator 61. This integrator will produce an output corresponding to the area $A_2$, as shown in FIG. 4. At the same time, the output of the signal generator 40 is also applied to the switching deck 56, position 2, to the input of the integrator 63. The output from the integrator 63 will be coupled through the switching deck 57, position 2, to the lead 91. The integrator 63 will thus be producing on its output the area A which, in FIG. 4, is bounded by the letters O—M—D—E—O.

As soon as the output A is equal to the sum of the areas $A_1$ plus $A_2$, it is desired that the input to the analog 20 be reduced. Since the switch 58 is closed when the ganged switches are in position 2, the signals applied to the lead 91 will be applied to the signal comparator 51. When an equality between the area A and the sums of the areas $A_1$ and $A_2$ is indicated by the signal on the lead 91, the relay coil 53 will be actuated by the signal comparator 51, and the apparatus of the ratcheting mechanism 54 will be actuated to step the switching decks from position 2 to position 3. When switching between positions 2 and position 3, the analog 20 will not be reset as it was after the first computing operation.

When the apparatus is switched to position 3, the input to the signal generator 40 will now be derived from the slider 47. The slider 47 is positioned by a conventional servo system which is sensitive to the magnitude of the output signal from the analog 20. The servo system comprises an amplifier 93 which reversibly drives the motor 94 to move the slider 47 on the potentiometer 45. The slider 47 on potentiometer 45 will have a potential which is proportional to the instantaneous magnitude of the output of the analog 20. In other words, the input to the signal generator is reset to a value corresponding to the instantaneous output of the process analog 20. The output of the signal generator will thus be the amount of instantaneous analog output required to take care of the losses in the process analog during that particular instant. As the analog output will continue to coast in an upward direction toward the desired set point line S, FIG. 4, the area under the line F—G is to be determined. This is determined in this instance by the integrator 63.

Stored in the integrator 63 at the time D—E when the apparatus was switched from position 2 to position 3 is the total input to the analog. This signal will remain on the output of the integrator 63 and when switched to position 3, any additional input signal will be integrated and added to the area A. The input signal to the integrator 63 when the switching decks are in position 3 will be derived from the output of the process analog 20 through switching decks 55, position 3, lead 95, to the input of the integrator 63.

As the output of the analog 20 continues to coast toward the desired set point value, the motor 94 will be effective to reset the slider 47 to produce on the input of the signal generator 40 an appropriate bias calling for the desired amount of input to take care of the losses in the analog 20. As soon as the output of the analog reaches the desired set point value, the signal comparator 50 will be effective to actuate its coil 52 and drive the ratcheting mechanism 54 into its next position at which time the respective decks will be switched to their position 4.

When the deck 57 is switched to position 4, the output of the integrator 63 will be applied to the input of the operational amplifier 68. The signal applied to the operational amplifier 68 will be proportional to the total amount of input required in the analog to change the measured variable from a first position to a desired set point position. This will in effect be the area under the curve shown in FIG. 4B.

The other input signal to the signal comparator 69 is derived from the actual input to the process as determined by the condition of the output of the process control 13. Under the presently assumed conditions, maximum power was applied to the process at the instant that the computing analog was put into operation. In other words, referring to FIG. 2, when the apparatus was put into operation, the rheostat 75 was shunted by the switch 76 and the switch 77 was closed so that the power from the input lines is applied directly to the heater within the furnace 10. The input signal is applied by way of the transducer 82, shown in FIG. 1, and a switch 83 closed when the apparatus is in position 4, to the integrator 70 which will produce a signal proportional to the total amount of input actually applied to the process 10. As soon as the output of the integrator 70 indicates that the total input to the process 10 corresponds to the predicted amount required as indicated by the output of the operational amplifier 68, the signal comparator 69 will produce an output signal on its output 71. Referring to FIG. 2, the output signal will energize the coil 78 and open switch contacts 76 and 77. When the switches 76 and 77 open, the input to the process is cut off. Referring to FIG. 4C, the process input is shown as continuing until the point J—K is reached on the time scale. The area defined within the space

O—M—J—K—O should correspond to the integrated signal area under the analog input curve shown in FIG. 4B.

With the input to the process completely cut off, the process output will coast up to the desired set point line as shown in FIG. 4D. As soon as the process variable reaches the desired set point value, the signal comparator 12 will produce an output signal which will actuate the relay coil 80, shown in FIG. 2, to close switch 79. If desired, the relay coil 80 may be timer controlled to be actuated a predetermined time after the process input has been shut down. This latter is desirable where there may be considerable dead time in the process. The closing of switch 79 will reconnect the rheostat 75 into the control circuit so that the signal comparator 12 may be used to adjust the rheostat 75 and the desired process variable magnitude will be maintained. Once the apparatus has actuated the switch contact 79, the computing portion of the apparatus may be disconnected and used on some other process. When the signal comparator 12 is switched to control the process, the rheostat 75 will be properly adjusted to maintain the desired magnitude of process variable on the output. Thus, at point L, FIG. 4C, the desired set point value will have been reached by the process variable and the input to the process will be switched to a correct value to maintain the process variable at the set point.

As it is not always convenient to accurately measure the input to the process 10 as by the transducer 82, shown in FIG. 1, it may be desirable to provide an apparatus modification, as shown in FIG. 5, wherein the input to the process is determined indirectly. In the modification in FIG. 5, the components corresponding to the apparatus shown in FIG. 1 carry corresponding reference characters. Added to the apparatus of FIG. 1 is a master analog 110. This master analog is constructed similar to the analog shown in FIG. 3 except that the time scale is selected to correspond to the time scale of the process 10 instead of the advanced time scale of the analog 20.

The output of the master analog is applied to the signal comparator 111 which also has an input from the process variable on the output of the process 10. The difference signals between the analog variable and the process variable will be used to establish a control bias for the signal generator 112. The output of the signal generator in turn will apply a predetermined input to the master analog so as to maintain the master analog in step with the process. The input to the analog 110 will thus be representative of the input to the process 10. The analog input is supplied by way of a lead 113 to the integrator 70.

The overall operation of the apparatus of FIG. 5 corresponds to that set forth above with the exception that the input signal applied to the integrator 70 is more indirectly representative of the actual process input. This will not change the overall basic functioning of the apparatus as explained above.

The apparatus of FIG. 6 is a further modification of the apparatus of FIG. 1. This particular modification is useful under circumstances where the input to the process varies considerably from the assumed maximum substantially constant input of FIG. 1. In the case of an electric furnace, the time it takes for the furnace temperature to change is increased as the applied power is decreased. Consequently, there will be more losses in the furnace than under normal conditions with full maximum input. As the computation of the computer is based upon a constant maximum input to the analog 20, the final signal must be corrected for wide variations in the input to the process 10. This is achieved in the modification shown in FIG. 6.

In FIG. 6, there has been added means for automatically adjusting the magnitude of the output signal from the amplifier 68. This means comprises an integrator 120 having a fixed input signal from a potentiometer 121 connected across a battery 122. The output of the integrator 120 is passed through a summing resistor 123 to the input of a servo amplifier 124. The servo amplifier 124 is connected to reversibly drive a motor 125, the latter being connected to drive the slider of a balancing potentiometer 126 and a signal level potentiometer 127. The slider of potentiometer 126 is connected by way of a summing resistor 128 to the input of the amplifier 124. a further summing resistor 129 connects the output of integrator 70 to the amplifier 124.

In operation, the apparatus of FIG. 6 is first adjusted so that with the desired maximum input to the process, there will be no input signal to the amplifier 124. To achieve this end, the potentiometer 121 is adjusted so that the output of the integrator 120 will be equal in magnitude and opposite in polarity to the output of the integrator 70. As long as there is not input to the amplifier 124, the motor 125 will remain stationary and the signal amplitude on the output of amplifier 68 will remain at its normal process prediction value.

In the input to the process should drop, the output signal from the integrator 70 will be less than that of integrator 120. The resultant error signal on the input of amplifier 124 will produce an adjustment of motor 125 to balance the error signal and to adjust potentiometer 127 in a direction to increase the amplitude of the signal on the output of amplifier 68 and this will indicate the need for more input to the process 10. When the additional input has been supplied, the output of integrator 70 will balance the input from amplifier 68 and the controller will then operate in the manner described in FIG. 1 to cut off the input to the process.

In the event the input to the process is above the assumed normal maximum input, the operation above will be reversed with a smaller signal appearing on the output of the amplifier 68. This will result in the process shutting down at a time earlier than predicted with normal input to the process.

*Summary*

While the apparatus above has been explained in conjunction with a start-up type of controller using predicting analog techniques, it should be readily apparent that the principles involved are applicable to a process controller wherein continuous supervision is being maintained of the process variable with respect to the set point. Thus, the predicting analog techniques are applicable to a system for continuously monitoring the condition of the process variable with respect to the set point. Further, pneumatic circuitry or mechanical circuitry may be used in a manner analogous to the electric system shown.

While, in accordance with the provisions of the statutes, there have been illustrated and described the best forms of the invention known, it will be apparent to those skilled in the art that changes may be made in the forms of the apparatus disclosed without departing from the spirit of the invention as set forth in the appended claims, and that, in certain cases, certain features of the invention may be used to advantage without a corresponding use of other features.

Having now described the invention, what is claimed as new and for which it is desired to secure Letters Patent is:

1. In a process controller, the combination comprising, predicting means producing a first signal indicative of the process operation required to change a process variable from one magnitude to another, said predicting means including an analog of the process to be controlled having an input and an output, signal means connected to said analog input to selectively apply thereto signals representative of predetermined process inputs, and integrating means selectively connected to said analog output and to said signal means to produce said first signal, process operational change totalizing means arranged to produce a second signal indicative of the total extent of the process operation applied to the process for effecting said change, and means for regulating the process connected to respond to said first and second signals.

2. Apparatus as defined in claim 1 wherein said operational change totalizing means comprises means measuring the input to the process and an integrator connected to totalize the output of said measuring means.

3. Apparatus as defined in claim 1 wherein said analog has a time constant which is a fraction of the time constant of the process.

4. In a process controller, the combination comprising predicting means producing a first signal indicative of the process operation required to change a process variable from one magnitude to another, process operational change totalizing means arranged to produce a second signal indicative of the total extent of the process operation applied to the process for effecting said change, and means for regulating the process connected to respond to said first and second signals, said operational change totalizing means comprising a master analog of the process, a signal generator connected to supply input signals to the master analog, a signal comparator having a first input arranged for connection to the process to measure the magnitude of the process variable and a second input connected to the output of the analog, means connecting said signal comparator to control said signal generator, and means connected to the output of said signal generator to produce a signal indicative of the input to the process.

5. Apparatus for measuring the input to a process comprising an analog of the process having an input and an output, a signal comparator having a first input to which said output of said analog is applied, having a second input to which is applied a measure of a variable of the process derived from means associated with the process and responsive to said variable thereof, and having an output in which is produced a control bias which is the difference between said analog output and said measure of said process variable, a signal generator connected to said output of said comparator and having an output which is controlled by said control bias, and means applying said generator output to said input of said analog, whereby said generator output is indicative of the input to the process which determines the value of said process variable.

6. An automatic process controller comprising means producing a first signal indicative of the input required in a process to change the process variable from one magnitude to another, means producing a second signal indicative at any given time of the total input supplied to the process up to that time, a process controller having an input circuit connected to said first and second named means, and a third means connected to vary the magnitude of said first signal in accordance with deviations of the process input rate from a predetermined magnitude.

7. A controller as set forth in claim 6 wherein said third means comprises an integrator having a fixed signal input representative of a predetermined magnitude of process input rate and a second integrator having the actual process input signal rate as an input.

8. Predicting apparatus for producing a signal representative of the total input to a process required to change a variable of the process from a first to a second predetermined value, comprising an analog of the process, said analog having an input and an output, signal means connected to said analog input to selectively apply thereto signals representative of predetermined inputs to the process, integrating means selectively connected to said analog output and to said signal means, and switching means included in the connections to said integrating means, connected to control said signal means, and operative in one condition to cause said signal means to apply to said analog input and to said integrating means signals representative of a maximum input to the process, and to cause said integrating means to produce an interim output signal representative of the portion of the total input to the process required up to a predetermined time for effecting said change, said switching means being operative in another condition to cause said signal means to apply to said analog input a signal derived from said analog output to cause said integrating means to increase its said output signal by an amount representative of a portion of said total process input needed to supply the losses in the process from said predetermined time to the time at which said change is completed, whereby said integrating means output signal is caused to be said signal representative of the total process input required to effect said change.

9. Apparatus for controlling a process to change a variable thereof from a first to a second predetermined value, comprising predicting means for producing a signal representative of the total input to the process required to effect said change, said means including an analog of the process, said analog having an input and an output, signal means connected to said analog input to selectively apply thereto signals representative of predetermined inputs to the process, integrating means selectively connected to said analog output and to said signal means, and switching means included in the connections to said integrating means, connected to control said signal means, and operative in one condition to cause said signal means to apply to said analog input and to said integrating means signals representative of a maximum input to the process, and to cause said integrating means to produce an interim output signal representative of the portion of the total input to the process required up to a predetermined time for effecting said change, said switching means being operative in another condition to cause said signal means to apply to said analog input a signal derived from said analog output to cause said integrating means to increase its said output signal by an amount representative of a portion of said total process input needed to supply the losses in the process from said predetermined time to the time at which said change is completed, whereby said integrating means output signal is caused to be said signal representative of the total process input required to effect said change, regulating means connected to the process for controlling the input thereto, process input totalizing means arranged to produce a second signal representative of the total input actually supplied to the process by said regulating means, and comparison means connected to receive said integrating means output signal and said second signal and connected to said regulating means to control the latter and hence the input to the process in accordance with the difference between the last mentioned two signals.

(References on following page)

References Cited in the file of this patent

UNITED STATES PATENTS

| | | |
|---|---|---|
| 2,503,213 | Philbrick | Apr. 4, 1950 |
| 2,519,615 | Wannamaker | Aug. 22, 1950 |
| 2,712,414 | Ziebolz et al. | July 5, 1955 |
| 2,784,359 | Kamm | Mar. 5, 1957 |
| 2,792,545 | Kamm | May 14, 1957 |
| 2,874,906 | Nissen | Feb. 24, 1959 |

OTHER REFERENCES

Catalog and Manual on GAP/R High Speed All Electronic Analog Computors for Research and Design (Philbrick), 1951, pages 6, 9, 30 and 31.

Computer Techniques in the Instrumentation Industries (Jones), ISA Journal, Feb. 1, 1954, pages 13–16.